United States Patent [19]

Chung

[11] Patent Number: 4,809,859

[45] Date of Patent: Mar. 7, 1989

[54] CORNER CONSTRUCTION FOR JOINING ANGULARLY RELATED MEMBERS

[75] Inventor: Ku S. Chung, Choongchungnam, Rep. of Korea

[73] Assignee: Samsung Electronics Co., Ltd., Suwon, Rep. of Korea

[21] Appl. No.: 9,670

[22] Filed: Feb. 2, 1987

[30] Foreign Application Priority Data

Jan. 31, 1986 [KR] Rep. of Korea ............ 1986-1163[U]

[51] Int. Cl.[4] .............................................. B65D 6/00
[52] U.S. Cl. ..................................... 220/4 R; 220/67; 220/75; 220/80; 403/402
[58] Field of Search ............... 220/4 R, 4 B, 4 E, 4 F, 220/7, 66, 67, 75, 76, 77, 73, 80; 403/401, 402, 403, 405.1, 409.1, DIG. 10

[56] References Cited

U.S. PATENT DOCUMENTS

| | | | |
|---|---|---|---|
| 3,189,136 | 6/1965 | Stickney | 403/402 |
| 3,226,008 | 12/1965 | Chiorri | 220/80 |
| 3,494,647 | 2/1970 | Farley | 403/402 |
| 3,802,591 | 4/1974 | Mizushima et al. | 220/80 |
| 3,872,688 | 3/1975 | Tillman | 62/329 |
| 4,050,498 | 9/1977 | Lucchetti | 403/402 |
| 4,161,977 | 7/1979 | Baslow | 403/401 |
| 4,550,576 | 5/1986 | Tate et al. | 62/441 |

FOREIGN PATENT DOCUMENTS 972215  9/1951  France ................. 403/401

Primary Examiner—Willis Little
Attorney, Agent, or Firm—Oblon, Fisher, Spivak, McClelland & Maier

[57] ABSTRACT

A corner construction fastening one cabinet plate member to another cabinet plate member by using a joining element, the cabinet plate members having a pair of inner and outer walls at both sides and the joining element having a body to support the walls and under sides of the members and two extensions to be inserted into slots formed in end portions of the walls.

8 Claims, 1 Drawing Sheet

4,809,859

CORNER CONSTRUCTION FOR JOINING ANGULARLY RELATED MEMBERS

FIELD OF THE INVENTION

The present invention relates to corner constructions for cabinet frames and more particularly though not exclusively to corner constructions for joining angularly related members for use in forming cabinets such as refrigerators.

BACKGROUND OF INVENTION

Conventionally, two adjacent corner portions of a cabinet are assembled with one another by means of spot-welding or separate connectors. However, scars or marks are made on the cabinet members by such welding or connection words, harming the cabinet's appearance. The scars or marks invite an additional work such as painting, which complicates the manufacturing process and results in inefficiency of the manufacturing process, since the additional painting can hardly be done in the same assembly workshop because of space limitations.

OBJECTS OF THE INVENTION

It is an object of the present invention to provide a cabinet structure that is manufactured only by two successive steps of painting and assembling without doing welding work.

It is another object of the present invention to provide a joining element for fastening angularly related members of a cabinet without harming the appearance of the members.

SUMMARY OF THE INVENTION

Accordingly, the present invention consists in joining elements each comprising a body, two extended parts, and two outwardly turned ribs with two angularly related plate portions comprising respectively two outer walls the end portions of which are cut out in order to meet each other in making corner joints and two inner walls which have a slot at each end to receive an extended part of the joining element.

BRIEF DESCRIPTION OF THE DRAWINGS

A preferred embodiment of the invention will now be described with reference to the accompanying drawings.

DETAILED DESCRIPTION OF THE INVENTION

Figure 1:
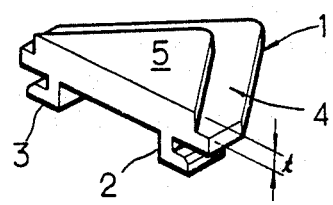
FIG. 1 is a perspective view of a joining element according to the present invention.
Figure 2:
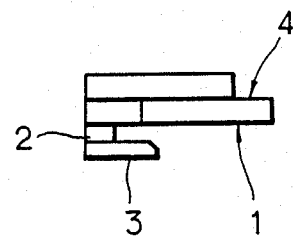
FIG. 2 is a side elevation of the joining element of FIG. 1.

FIGS. 1 and 2 shows a joining element 1 according to a preferred embodiment of the present invention. The joining element 1 comprises an angular body 5, two extensions 2 each of which has an outwardly turned rib 3, and a lowered surface 4 of the angular body 5.

Figure 3:
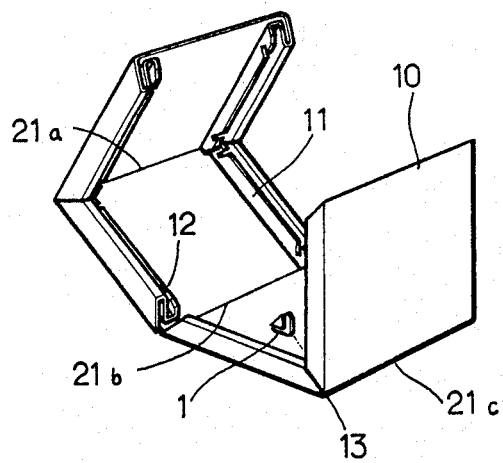
FIG. 3 shows the joining element and an iron sheet plate bent to form a cabinet structure and formed with outer and inner walls according to the invention.

In FIG. 3, there is disclosed a sheet metal plate bent along the fold lines 21a, 21b, and 21c to define four angularly related plate members 10, with each plate member 10 having a pair of spaced walls 15 (hereinafter referred to as "the outer wall") and 16 (hereinafter referred to as "the inner wall") projecting therefrom and four corner portions 13. The walls 15 and 16 of the plate members 10 are formed and then cut out at the corner portions 13 so that the end portions of two adjacent outer walls 15 meet on the same plane, while the end portions of two adjacent inner walls 16 lie one upon another as shown in FIGS. 3 and 4. Such wall-forming and cut-out works must be done before the sheet metal plate is bent into the angularly related plate members 10 to form the shape of the cabinet structure.

A slot 12 is formed near each end portion of the inner walls 16, leaning toward the end portion, so that it may receive an extension 2 of a joint element 1.

As shown in FIG. 3, slots 12 are preferably formed in the inner walls 16 in order not to affect the appearance of the cabinet.

The angular body 5 of the joint element 1 has a front end of rectangular shape with two straight sides so that each side of the front end may meet and support the under side of one of the angularly related plate members 10.

Each of the outwardly turned ribs 3 serves as a support piece for holding an end portion of the corresponding inner wall 16 when the corresponding extension 2 is inserted into one of the slots 12.

Figure 5:
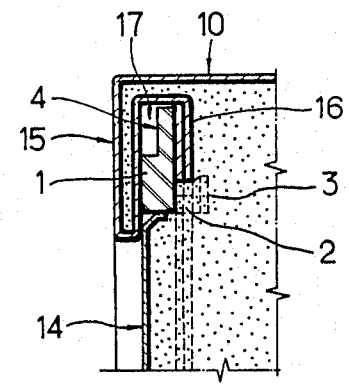
FIG. 5 is a cross section on the line V—V of FIG. 4(B), in which spaces of the walls are filled with polyurethane foam.

The body 5 of the element 1 has a certain thickness t, sufficient to hold both an outer wall and an inner wall, and the body 5 is preferably lowered at the surface 4 to provide a passage 17 for a heat-radiating pipe, electric wires, etc. between the lowered surface 4 and the outer wall 15 as shown in FIG. 5.

Figure 4A:
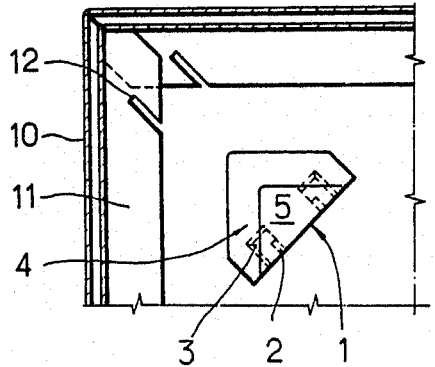
FIGS. 4(A) and (B) illustrate how the corner construction is assembled.
Figure 4B:
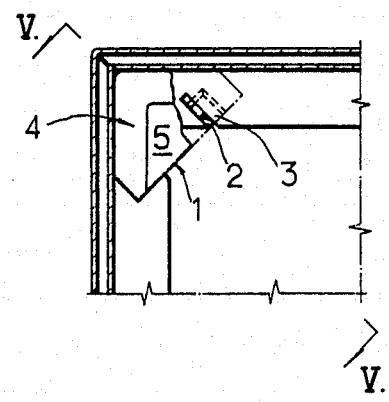

As can be seen in FIGS. 3, 4(A) and 4(B), two angularly related plate members 10 are bent into an angular relation along the fold line so that they are supported and fastened together by a joining element 1 when each extension 2 of the joining element 1 is engaged with the corresponding slot 12.

When each extension 2 of a joint element 1 is engaged with a corresponding slot 12 in an inner wall 16, each angular side of the front end of the joining element 1 supports an under side of two adjacent angularly related plate members 10. Therefore, all corners of the angularly related plate members 10 are held together and fixed firmly at right angle to each other, resulting in a rectangular outer cabinet structure.

Then, an inner cabinet 14 is placed inside the outer cabinet structure and the space between them is filled with polyurethane foam to accomplish a cabinet construction.

According to the invention, only two steps of painting and assembling suffice for manufacturing a cabinet structure.

Furthermore, the lowered surface 4 of the joining element 1 eliminates the necessity of an additional retaining means for any elongated materials such as heat-radiating pipes and electric wires.

Apart from the above preferred embodiment of the invention, the joining element 1 may have a front end of an angle more or less than 90 degree according to the shape of the cabinet to be made, may have inwardly turned ribs, and may not have a lowered surface 4. The outer cabinet structure may comprise more than four separate sheet plates of metal or plastics or other materials, and it may be formed with inner and outer walls of one layer.

The above description is to be considered as illustrative and not restrictive, and the scope of the invention is indicated by the appended claims, not by the above description. Therefore, it will be understood by those skilled in the art that various changes may be made without departing from the spirit or essential characteristics of the invention.

What is claimed is:

1. A corner construction comprising:
   (a) a joining element having:
      (i) an angular body which is lowered at the front end of a right angle or an obtuse angle consisting of two straight sides and
      (ii) two extensions each of which has a rib and
   (b) two angularly related plate members each of which has a pair of two spaced walls, the end portions of the two outer walls being cut out in order to meet each other in making corner joints and the end portions of the two inner walls each having a slot sized, shaped, and positioned to receive one of said extensions of said joining element so that said joining element is engaged against said corner joints and holds them firmly.

2. A corner construction according to claim 1 wherein said angular body has a certain thickness to support said two spaced walls of said angularly related plate members.

3. A corner construction according to claim 1 wherein said ribs are outwardly turned.

4. A corner construction according to claim 1 wherein said two angularly related plate members are made by bending a sheet plate.

5. A corner construction according to claim 1 wherein said two angularly related plate members are made by two separate sheet plates.

6. A corner construction according to claim 1 wherein said two spaced walls are made by a bending operation.

7. A corner construction according to claim 1 wherein said two angularly related plate members are made by a molding process.

8. A corner construction according to claim 1 wherein each one of said slots is made so that it leans toward the end portion of the corresponding one of said inner walls.

* * * * *